: # 3,054,849
ENCLOSURE FOR CABLE SPLICES
Lee J. Colbert, Snyder, N.Y., assignor to Robertson Electric Co., Inc., Buffalo, N.Y., a corporation of New York
Filed Sept. 26, 1960, Ser. No. 58,440
1 Claim. (Cl. 174—92)

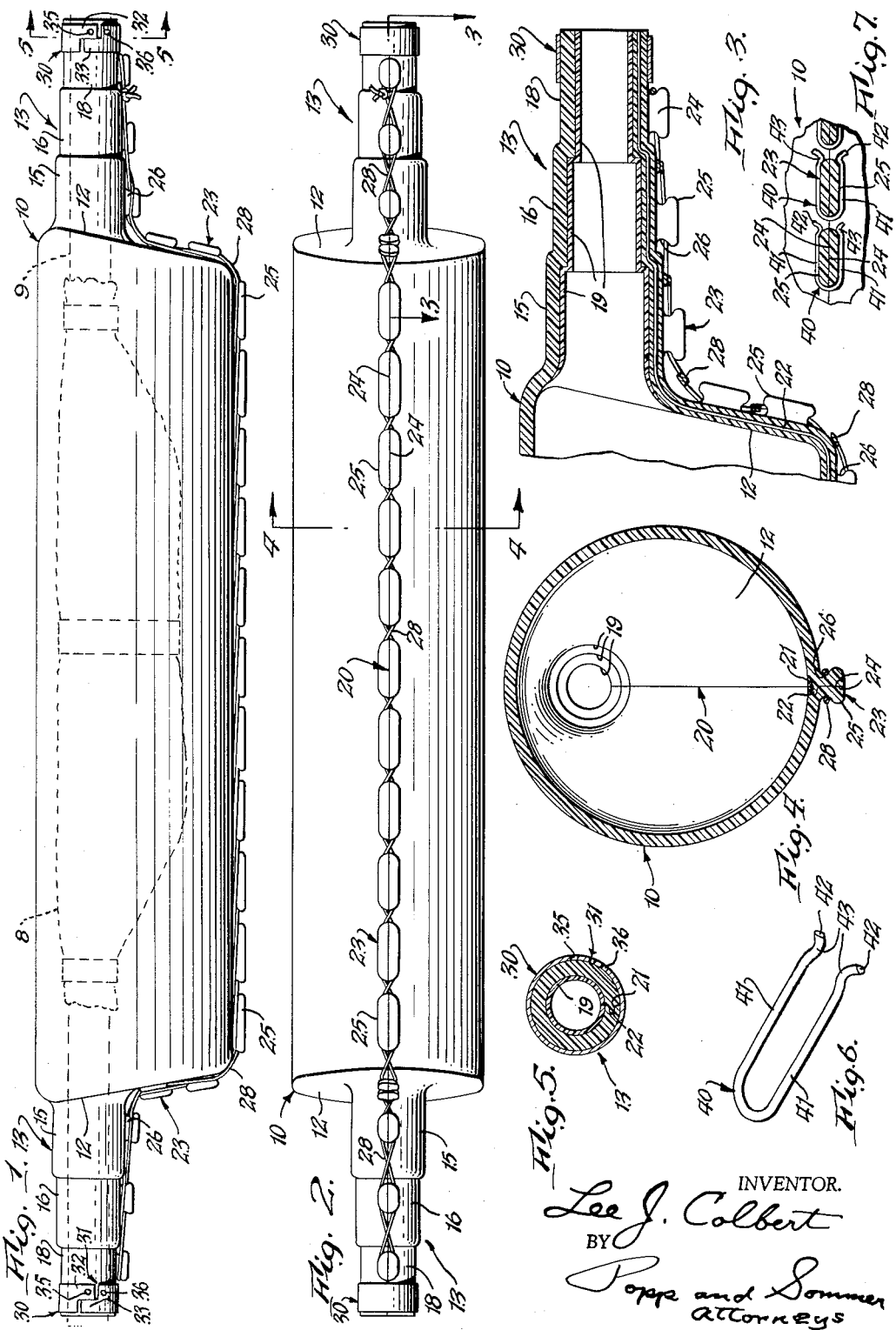

This invention relates to a case or housing for enclosing the splices made in electrical wires or cables and is more particularly illustrated as an enclosure for commercial outdoor multiple conductor communication cables to protect the splices of the conductors from the weather although the invention is applicable to power cables and wires and to underground or underwater service.

A principal object of the present invention is to provide such an enclosure for cable splices which can be quickly and reliably attached to the cable over the completed splices.

Another object is to provide such an enclosure which is adequately sealed to the cable at opposite sides of the splice and which also adequately protects the splice from external water, moisture or other agents.

Another object is to provide such an enclosure which can be readily removed and replaced as conditions may require.

Another object of the invention is to provide an enclosure having a one-piece body which can be readily attached to the cable after the splice has been made and readily sealed to protect the splice against external conditions.

Another object is to provide such an enclosure which can be readily attached to cables of different standard sizes.

Other objects and advantages of the invention will be apparent from the following description and drawings in which:

FIG. 1 is a side elevational view of an enclosure embodying the present invention for outdoor multi-wire communications cable splices.

FIG. 2 is a bottom plan view thereof.

FIG. 3 is a fragmentary enlarged horizontal section taken generally along the line 3—3, FIG. 2.

FIG. 4 is an enlarged transverse vertical section taken generally on line 4—4, FIG. 2.

FIG. 5 is an enlarged vertical transverse section taken generally on line 5—5, FIG. 1.

FIG. 6 is a perspective view of a U-shaped clip, which clips can be used in lieu of the cord shown in FIGS. 1–5.

FIG. 7 is a fragmentary sectional view through the knobs showing the manner in which the clips, illustrated in FIG. 6, can be applied.

The enclosure of the present invention is illustrated as encasing and protecting from the weather the splice 8 of a commercial multiple conductor communications cable 9, this splice necessarily being of substantially greater size than the cable itself and, such splices in outdoor overhead communication cables requiring full protection from the weather. The invention is applicable to power wires and cables, however, and to underground and underwater use.

A feature of the invention resides in the tubular, thin walled, manually flexible body 10 of the enclosure being of one piece, this body preferably being made of a molded and manually flexible material which has considerable weather resisting properties. Depending on the temperatures or other conditions encountered, the body 10 could be a polyethylene, polyvinylchloride, natural or silicone rubber or other manually resilient organic plastic. Desirably the body has in the order of a 70 durometer resilience. The tubular body 10 is shown as being of cylindrical form to receive the enlarged splices 8 and having end heads 12. The body 10 is provided with a pair of end necks 13 projecting outwardly from each end head 12 and which necks are sealed around the communications cable 9 on opposite sides of the splice 8. Preferably these necks 13 aline with each other and are parallel with the major axis of the enclosure. Also preferably these necks project from the upper parts of the end heads 12 along an axis arranged above the center of the body so that the body is pendant with reference to the necks 13.

Each neck 13 is stepped or tapered to fit different sizes of cables, each neck being shown as having an inner cylindrical part 15 of relatively large diameter to fit a large sized cable, a cylindrical intermediate portion 16 of intermediate diameter to fit a medium sized cable, and a cylindrical portion 18 of minimum diameter to fit the smallest sized cable or wire. Each neck 13 is lined with a lining 19 formed of a soft resilient plastic material which can adapt itself to the external surface of the cable and provide a weather-tight seal between the enclosure 10 and the cable at each side of the splice. Preferably this lining has in the order of a 30 durometer resilience.

A feature of the invention resides in the body 10 and necks 13 being split along one side from the open end of one neck 13 to the open end of the opposite neck. This split, indicated at 20, is preferably in a vertical plane and along the bottom of the enclosure so that the top and sides of the cable and its splice is housed in a one-piece housing having no openings through which rain or moisture can enter.

To provide additional protection against the weather the opposite sides of the split 20 are preferably of tongue and groove form as illustrated in FIGS. 4 and 5. Thus, one side of the split is formed to provide a circumferentially opening groove 21 facing the opposite side of the split and extending the full length thereof from the end of one neck 13 to the end of the opposite neck 13. In this groove is fitted a circumferentially extending tongue 22 integrally formed with the body on the opposite side of the split and also extending the full length of the split. It will be seen that when interfitted this tongue and groove connection provides an adequate seal against moisture entering the enclosure through the split 20.

An important feature of the invention resides in the provision of means at spaced intervals along the opposite sides of split 20 for reliably securing the tongue and grooved edges of the body 10 at the split together. Such means preferably consist of a plurality of knobs 23 formed integrally with the body portion 10 and projecting outwardly therefrom in pairs arranged side by side and extending radially from the body at opposite sides of the split 20. Preferably these knobs have flat mating faces 24 arranged to contact or interfit one another so that the knobs of each pair, when brought together, present the appearance of a single knob having a regular external surface. When such contact or interfit exists, the tongue and groove seal 22, 21 is, of course, under compressive sealing pressure. Also each such pair of knobs preferably has an enlarged head 25 providing external grooves 26 extending along opposite sides of each pair of knobs.

Such pairs of knobs 23 of such form, when brought together, can be laced together by means of a cord or lace 28. This lace can be in form of a single piece of strong weather resistant cord which can first be passed around one of the endmost pairs of knobs 23. This lace can also be elastic. The ends of the cord can then be crossed and brought around the second pair of knobs 23. This criss-crossing of the cord between the successive pairs of knobs 23 is continued to the opposite endmost pair of knobs 23 where the ends of the cord can be tied together in any suitable manner. It will be seen that in such lacing substantial pressure can be brought to bear upon each of the many pairs of knobs 23 and hence that the split 20 can be reliably sealed against the entrance of moisture, water or other foreign agents. It will also be seen that such lacing can readily and reliably be done under adverse working conditions, requiring no tools and involving a very simple manipulation of relatively large materials.

Before being applied to the cable the proper diameter of the necks 13 is selected to suit the particular cable size. If the cable is of minimum diameter nothing is done to the necks 13, the minimum diameter end extremities 18 of these necks is used. If, however, the cable is of a larger size, the corresponding section 16 or 15 would be selected. Assuming the cable to be of the largest diameter for which the enclosure is designed, the neck portions 15 would be selected and the necks 13 would be cut along a transverse plane intersecting the outer ends of the portions 15 and the severed ends 16, 18 would be thrown away. The body 10 and necks 13 are then spread or opened up along the split 20 and the body placed around the splice 8 and the necks fitted around the cable 9. With the necks 13 properly attached to the particular cable size, the soft resilient liners 19 will yieldingly fit around the exterior of the cable and can be clamped into tight sealed engagement therewith. Such clamping can be effected by any suitable clamping ring such as is shown in FIGS. 1–5.

These clamp rings, indicated generally at 30, are in the form of axially split collars having substantial spring strength and biased toward the closed or contracted position shown. The split, indicated generally at 31, is preferably Z-shaped so as to provide a tongue 32 at one side and one end of the spring collar arranged alongside and in sliding contact with a tongue 33 at the other side and other end of the collar. In line with the tongue 32 a small hole 36 is provided at the opposite end of the split ring and a companion hole 35 is provided through the tongue 32. These rings are applied over the ends of the necks 13 so as to embrace the portion which fits the cable. This is done by spreading the holes 35, 36 by means of a conventional tool (not shown) to enlarge the diameter of each spring ring so as to permit it to be slipped over its neck 13. Upon then releasing the ring, its inherent resiliency causes it to contract and firmly embrace the neck 13. This compresses the soft resilient lining 19 into sealing engagement with the cable and prevents water or moisture flowing along the cable from entering the enclosure 10. The split rings 30 exert a constant contracting pressure on the end necks of the shell to compensate for cold flow of the plastic. Thus, both the soft plastic lining 19 and the stiffer plastic shell 10 are subject to slow displacement of cold flow of the plastic under pressure. As this occurs, the ring springs 30 contract to still exert substantially the same sealing pressure against the wire or cable.

Instead of lacing the pairs of knobs 23 together as shown in FIGS. 1–4, these knob halves can be individually clasped together by the clips shown in FIGS. 6 and 7. Each of these clips is in the form of a single piece 40 of spring wire of U-shaped or hairpin form with its legs 41 biased toward each other. For ease in spreading these legs 41 their outer ends 42 can be flared or diverge outwardly relative to each other and to prevent slipping of the clips from the contracted necks of the knobs, the outer ends 42 can be bent to provide points of close approach in the form of opposing teats or detents 43. As illustrated in FIG. 7, the legs 41 of each clip 40 are manually spread and slipped over each pair of knobs 23 in line with the grooves or contracted portions 26 thereof. On release, the legs 41 contract into compressive relation with the knobs to maintain the seal along the tongue and groove joint 22, 21 in the same manner as with the cord 28. The teats or detents 43 guard against these clips slipping off the knobs while at the same time the clips can be easily removed because of their diverging ends.

From the foregoing it will be seen that the present invention provides a very simple and completely water and weather tight enclosure for the spliced ends of a communications cable or the like. It will particularly be noted that the body 10 is in the form of one piece of a plastic which is manually flexible and can be quickly slipped over the splice. It will also be seen that the body can be quickly and reliably sealed along the full length of the split by the simple expedient of the criss-cross lacing as shown.

What is claimed is:

An enclosure for cable splices and the like, comprising an axially elongated tubular, thin-walled, manually flexible body having integral end heads at its opposite axial ends and having coaxial, integral tubular cable embracing necks severally projecting outwardly from said end heads along an axis arranged to one side of the center of the body and said necks communicating with the interior of the body, a lining of a resilient material softer than said body lining said necks, said body, end heads and tubular necks and their linings being split along one side generally parallel with said axis from the outer end of one neck to the outer end of the opposite neck, whereby said body and its end heads and necks can be opened up to receive a completed splice and said necks brought into contacting embracing relation with the cable on opposite sides of said split, a series of outwardly projecting integral protuberances arranged in pairs along opposite sides of said split with the protuberance of each pair being substantially in contact with each other, certain of said protuberances projecting radially from said body, other of said protuberances projecting axially from said end heads and other of said protuberances projecting radially from said necks, and fastening means embracing all of said pairs of protuberances and holding them and the adjacent edges of said split in pressure contact with each other.

References Cited in the file of this patent

UNITED STATES PATENTS

| | | |
|---|---|---|
| 1,977,774 | Osborne | Oct. 23, 1934 |
| 2,803,696 | Hefner | Aug. 20, 1957 |
| 2,839,596 | Cheney et al. | June 17, 1958 |

FOREIGN PATENTS

| | | |
|---|---|---|
| 505,013 | Great Britain | May 1, 1939 |
| 1,037,391 | Germany | Aug. 28, 1958 |